Nov. 4, 1958 R. J. KRAUSE 2,858,877
SLIDABLE DRIVER'S SEAT FOR DELIVERY VEHICLES
Filed Dec. 21, 1955

INVENTOR
REUBEN J. KRAUSE

BY *Scrivener & Parker*

ATTORNEYS

United States Patent Office 2,858,877
Patented Nov. 4, 1958

2,858,877

SLIDABLE DRIVER'S SEAT FOR DELIVERY VEHICLES

Reuben J. Krause, Clintonville, Wis.

Application December 21, 1955, Serial No. 554,436

2 Claims. (Cl. 155—14)

This invention relates broadly to automobile and similar vehicles and more particularly relates to the seats of such vehicles and is intended to provide a single-occupant seat which may be moved laterally of the vehicle.

The delivery of rural mail and other articles to boxes along both sides of a road requires the driver of a delivery vehicle to move himself from side to side of the vehicle along the usual seat in order to make deliveries through the opposite side windows of the vehicle. In order to do this, the driver must slide himself over the seat and accordingly cannot have mail or other articles on the seat, in addition to which there is the disadvantage that considerable physical effort is required in making a great number of movements back and forth across the seat in the course of delivering a large number of items. It has accordingly been the object of this invention to provide an improved seat construction for the driver of a delivery vehicle by which he may remain in his seat and slide the same transversely of the vehicle in order to make delivery from either side thereof, while at the same time retaining control of the vehicle. It has been another object of the invention to provide a structure for supporting such a transversely slidable driver's seat which is so constructed that it may be expanded or contracted to fit vehicles of various sizes and thus permit it to be substituted for the usual front seat of an automobile or other vehicle. It has been a further object of the invention to provide means at and connected to the laterally slidable driver's seat for supporting, in a place readily and immediately convenient to the driver, the mail or other articles which are to be delivered.

Figure 1:
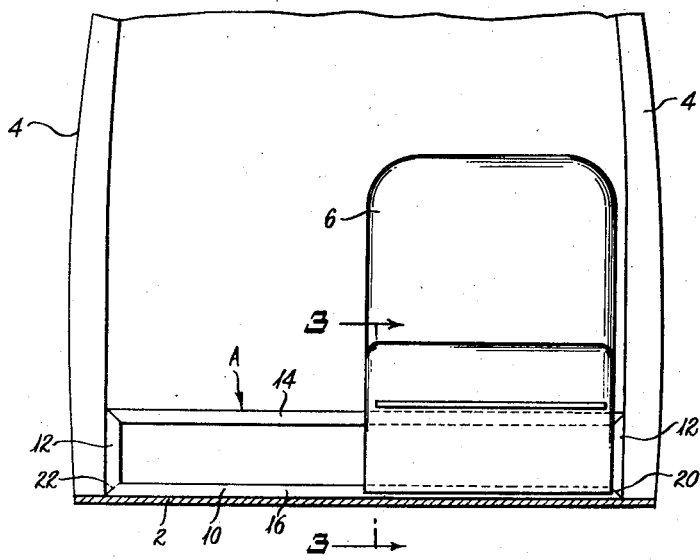
Figure 2:
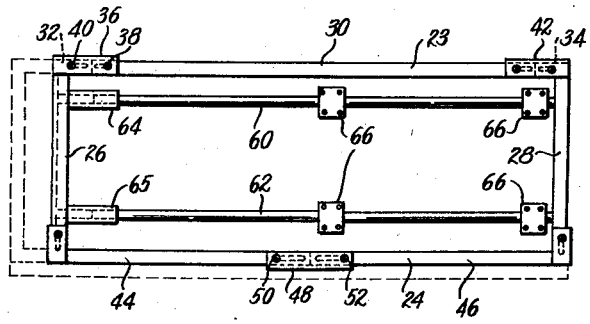
Figure 3:
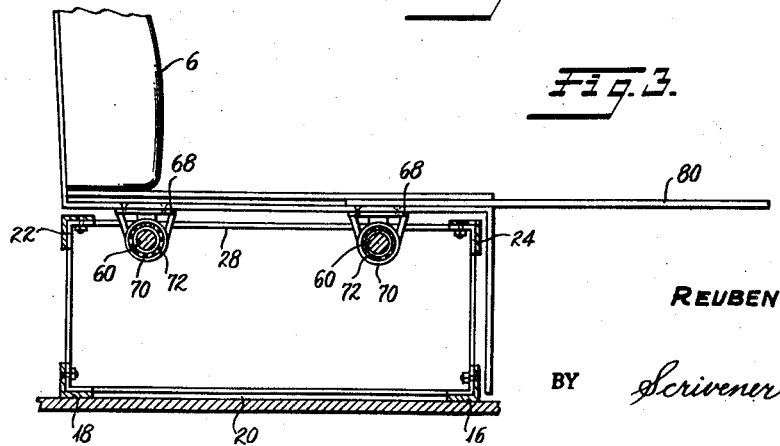

Other objects and advantages of the invention will be made apparent by the following specification in which there is described one embodiment which the invention may take, this being also illustrated in the accompanying drawings, in which Fig. 1 is a view taken transversely through an automobile vehicle showing a seat according to the invention and the supporting means therefor;

Fig. 2 is a top plan view of the supporting framework for the slidable seat, and Fig. 3 is a sectional view taken on line 3—3 of Fig. 1.

In the embodiment of the invention disclosed in the drawings there is illustrated part of a usual automobile or other vehicle having a floor 2 and side walls 4 within which are provided the usual door and window openings. Such a vehicle normally and usually has a seat permanently fixed to the floor and extending laterally between the side walls. In accordance with my invention this usually permanent seat is removed and in place thereof there is provided a supporting framework A on which there is mounted a single-occupant seat 6 which is occupied by the driver and which may be slidably moved from side to side of the vehicle to permit the driver to make deliveries through either side window. The supporting framework A is in the form of a rectangular, parallelopiped having a rectangular lower frame 10, vertical supporting columns 12 which are arranged at each of the four corners of the base frame 10 and an upper rectangular frame 14. All of the members of this supporting frame are preferably formed of angle irons but may be formed of other structural shapes. The lower frame member 10 comprises parallel members 16, 18, which extend laterally of the vehicle, and parallel members 20, 22 which connect the ends of the members 16, 18 and extend longitudinally of the vehicle. The upper frame member 14 is of the same size as the lower frame member and comprises parallel members 23, 24, which extend laterally of the vehicle, and side members 26, 28 which connect the ends of the members 23, 24 and extend longitudinally of the vehicle.

Means are provided by the invention for adapting the framework A to vehicles of various sizes. In accordance with this feature of the invention each of the four laterally extending frame members 16, 18, 23, 24 is formed of two aligned parts and the adjacent ends of the two parts of each of these members is telescopically received in a short sleeve member which is releaseably connected to the two parts, whereby the two parts of each of these frame members may be moved with respect to each other to change the length of the entire framework in a direction transverse of the vehicle. In the embodiment of the invention which is disclosed, the upper frame member 23 is formed of a central part 30 and two end parts 32, 34 which are aligned with the central part and, together with it, form the entire frame member 23. The end piece 32 and the central member 30 are connected for movement toward and away from each other by a short sleeve member 36 which may be rigidly connected to the end piece 32 but which is only releasably connected to the central piece 30 and which may be connected to or released from the central piece by means of a set-screw 38. If desired, the end piece 32 may also be connected to the sleeve member 36 by a set-screw 40. The second end piece 34 may be movably connected to the central member 30 by means of a second sleeve member 42 in the same manner as the end member 32. The upper transverse member 24 may be formed and constructed in exactly the same manner as member 23 or, if desired, it may be formed of only two aligned parts 44, 46 connected by a sleeve member 48 which receives the two parts 44, 46 and is releasably attached thereto by set screws 50, 52. It will be understood that each of the four transverse members 16, 18, 23, 24 of the framework A will be constructed in the described manner in order to permit the framework A to be made longer or shorter in a direction transverse of the vehicle, as indicated by the full-line and dotted-line positions of the framework in Fig. 2. In the same manner, each of the four longitudinal members of the framework A is formed of separate aligned parts connected by sleeves in order to permit adjustment of the size of the framework A in a direction longitudinal of the vehicle as is also indicated by dotted and full lines in Fig. 2.

The framework A supports two tubes 60, 62 which extend laterally of the vehicle between the upper side frame members 26, 28 and which are spaced apart in a direction fore and aft of the vehicle. Each of these tubes is formed of two aligned parts and the adjacent ends of the two parts of each tube are telescopically received in a sleeve 64, 65, thus permitting each tube to be elongated or shortened as the length of the framework A is adjusted laterally of the vehicle. Each of these tubes has mounted thereon two seat supporting members which are indicated at 66 and each of these supporting members 66 comprises an upper platform part 68 which is disposed above the tube and is mounted thereon by means of a tubular bearing member 70 having ball bearings 72 disposed between it and the tube in order that each seat-supporting member 66 may be easily moved along the length of the tube. The lower surface of the seat 6 is permanently attached to the upper platform members 68 of the seat-supporting devices 66 whereby the seat may be moved along the length of the tubes 60 from side to side of the vehicle. A platform member 80 may be mounted between the lower base of the seat and the seat itself and extends forwardly from the framework A and from the seat to provide a surface on which the mail or other articles to be delivered may be placed.

It will be seen that I have provided by this invention a single-occupant seat for an automobile or other vehicle which takes the place of the usual front seat of such a vehicle and which may be moved from side to side thereof. This single seat is occupied by the driver of the vehicle and is normally in the driving position behind the steering wheel. In this position the driver may make deliveries through the left-hand window or panel but, when necessary, he may stop the vehicle adjacent a box located on the right hand side of the road and slide himself and the seat to the right hand window of the vehicle to make a delivery, after which he may slide himself and the seat back to the driving position.

While I have described and illustrated one form which my invention may take, it will be apparent to those skilled in the art that other embodiments, as well as modifications of those disclosed, may be made and practiced without departing in any way from the spirit or scope of the invention, for the limits of which reference must be made to the appended claims.

What is claimed is:

1. In an automobile or other vehicle having a floor and side walls with window openings therein, a rectangular parallelopiped framework formed of four horizontal members extending laterally of the vehicle, four horizontal members extending longitudinally of the vehicle and connecting the ends of the laterally extending members and four vertical members at the corners of the framework, each of the longitudinally and laterally extending members being formed of separate aligned parts, a sleeve member telescopically receiving the adjacent ends of the aligned parts of each of the laterally and longitudinally extending frame members, two elongated members supported by the framework and extending laterally of the vehicle each of which is formed of two aligned parts, a sleeve member telescopically receiving the adjacent ends of the aligned parts of the elongated members, a seat, means for slidably mounting said seat on said elongated members for movement from side to side of the vehicle.

2. In an automobile or other vehicle having a floor and side walls with window openings therein, a rectangular parallelopiped framework formed of four horizontal members extending laterally of the vehicle, four horizontal members extending longitudinally of the vehicle and connecting the ends of laterally extending members and four vertical members at the corners of the framework, each of the longitudinally and laterally extending members being formed of separate aligned parts, a sleeve member telescopically receiving the adjacent ends of the aligned parts of each of the laterally and longitudinally extending frame members, two elongated members supported by the framework and extending laterally of the vehicle, each of which is formed of two aligned parts, a sleeve member telescopically receiving the adjacent ends of the aligned parts of the elongated members, two seat-supporting members including upper platform parts disposed above the said elongated members and mounted by antifriction means on each of the two elongated members, and a seat mounted on said four seat-supporting members for sliding movement along the elongated members from side to side of the vehicle.

References Cited in the file of this patent

UNITED STATES PATENTS

| | | |
|---|---|---|
| 2,579,597 | Moroney | Dec. 25, 1951 |
| 2,615,493 | Hunter | Oct. 28, 1952 |
| 2,664,258 | Lanier | Dec. 29, 1953 |

FOREIGN PATENTS

| | | |
|---|---|---|
| 609,671 | Great Britain | Oct. 5, 1948 |
| 611,600 | France | July 12, 1926 |